United States Patent
Saario

(10) Patent No.: US 6,272,354 B1
(45) Date of Patent: Aug. 7, 2001

(54) METHOD FOR ADJUSTING TRANSMIT POWER DURING CALL SET-UP, AND A CELLULAR RADIO SYSTEM

(75) Inventor: Eija Saario, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/011,804

(22) PCT Filed: Aug. 16, 1996

(86) PCT No.: PCT/FI96/00444

§ 371 Date: May 1, 1998

§ 102(e) Date: May 1, 1998

(87) PCT Pub. No.: WO97/07600

PCT Pub. Date: Feb. 27, 1997

(30) Foreign Application Priority Data

Aug. 18, 1995 (FI) .......................................... 953902

(51) Int. Cl.⁷ .......................................... H04B 7/00
(52) U.S. Cl. .......................... 455/522; 455/422; 455/69
(58) Field of Search .................. 455/422, 69, 95, 455/522, 68

(56) References Cited

U.S. PATENT DOCUMENTS

| | | | |
|---|---|---|---|
| 5,216,692 | * 6/1993 | Ling | 375/1 |
| 5,430,760 | 7/1995 | Dent | 375/200 |
| 5,485,486 | * 1/1996 | Gilhousen et al. | 375/205 |
| 5,487,180 | * 1/1996 | Ohtake | 455/54.1 |
| 5,566,165 | * 10/1996 | Sawahashi et al. | 370/18 |
| 5,710,974 | * 1/1998 | Granlund et al. | 455/33.2 |
| 6,084,904 | * 7/2000 | Wang et al. | 375/130 |

FOREIGN PATENT DOCUMENTS

| | | |
|---|---|---|
| 0 515 335 A3 | 11/1992 | (EP) . |
| 0 639 896 A1 | 2/1995 | (EP) . |
| 952396 | 11/1996 | (FI) . |
| WO 88/04498 | 6/1988 | (WO) . |
| WO 93/19537 | 9/1993 | (WO) . |
| WO 95/02950 | 1/1995 | (WO) . |

OTHER PUBLICATIONS

IEEE 0–7803–2955–4/95 Li Zhengmao et al., "The estimation of a CDMA personal system with feedback power control", Apr. 1995.*

\* cited by examiner

*Primary Examiner*—Daniel Hunter
*Assistant Examiner*—C. Chow
(74) *Attorney, Agent, or Firm*—Perman & Green, LLP

(57) ABSTRACT

A cellular radio system and a method for adjusting transmit power during call set-up. The system comprises at least one base station and a group of subscriber equipment communicating with one or more of the base stations. The signal-to-noise ratio between the subscriber equipment and a base station is estimated before an actual connection is set up. In order that the new connection not interfere with the existing connections, a desired power transmit value with which the desired signal-to-noise ratio is obtained is calculated for the transmit power of the transmitter. An initial value for the transmit power is calculated by means of the power-control parameters of the system and a given time constant and the transmission is started with the initial value. The transmit power in increased from the initial value to the desired power transmit value during a given time constant.

21 Claims, 2 Drawing Sheets

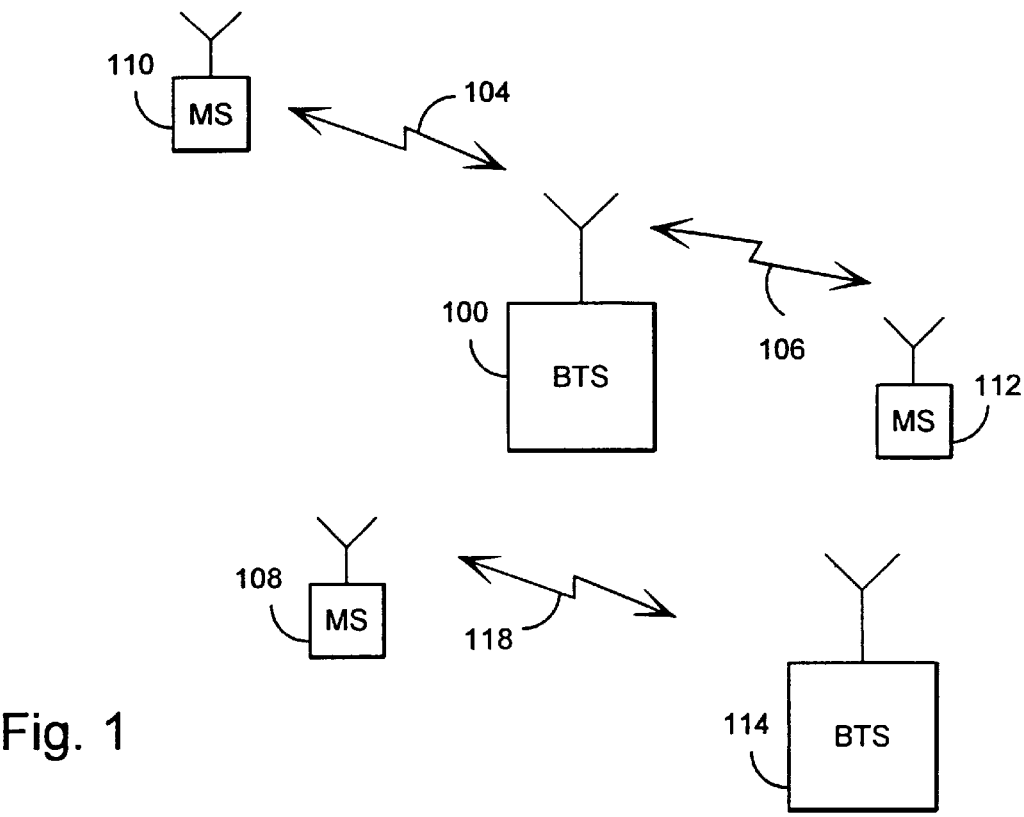
Fig. 1
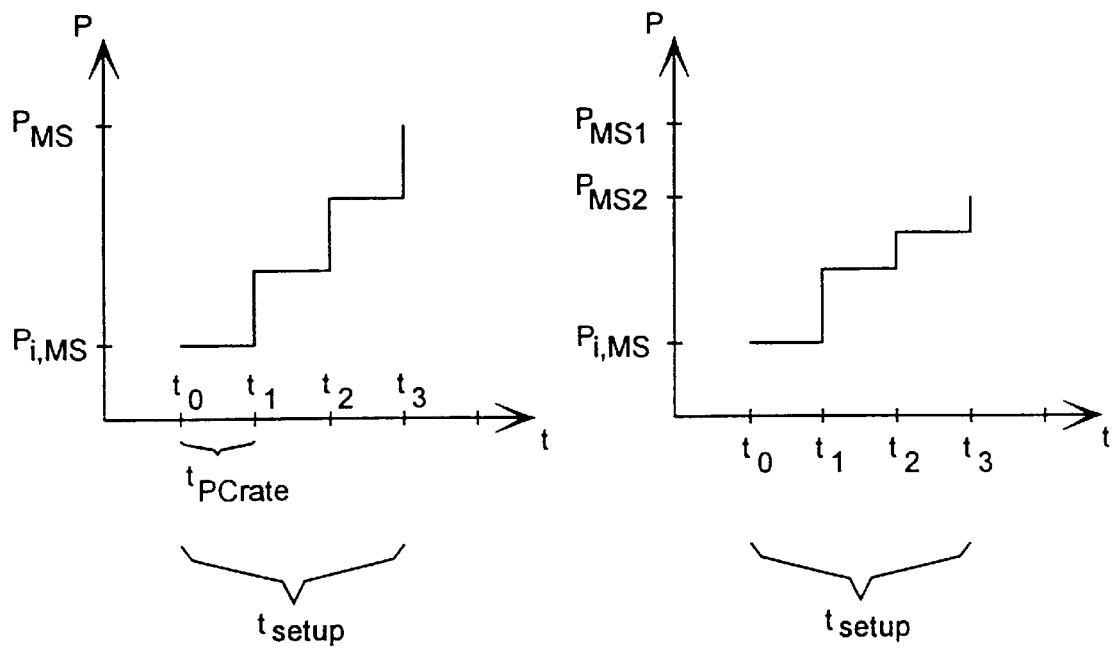
Fig. 2a
Fig. 2b

METHOD FOR ADJUSTING TRANSMIT POWER DURING CALL SET-UP, AND A CELLULAR RADIO SYSTEM

FIELD OF THE INVENTION

The present invention relates to a method for adjusting transmit power during call set-up in a cellular radio system comprising in each cell at least one base station and a group of subscriber equipments communicating with one or several base stations, and in which method the signal-to-noise ratio between a subscriber equipment and a base station is estimated before an actual connection is set up.

BACKGROUND OF THE INVENTION

The present invention is applicable for use in all cellular radio systems and in so-called WLL (Wireless Local Loop) systems that are interference-limited, and especially in a radio system utilizing code division multiple access. Code division multiple access (CDMA) is a multiple access method, which is based on the spread spectrum technique and which has been applied recently in cellular radio systems, in addition to the prior FDMA and TDMA methods. CDMA has several advantages over the prior methods, for example spectral efficiency and the simplicity of frequency planning.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of the different users can be distinguished from one another in the receivers on the basis of the spreading code of each user.

Matched filters provided in the receivers are synchronized with a desired signal, which they recognize on the basis of a spreading code. The data signal is restored in the receiver to the original band by multiplying it again by the same spreading code that was used during the transmission. Signals multiplied by some other spreading code do not correlate in an ideal case and are not restored to the narrow band. They appear thus as noise with respect to the desired signal. The spreading codes of the system are preferably selected in such a way that they are mutually orthogonal, i.e. they do not correlate with each other. In practice the spreading codes are not orthogonal, and the signals of the other users hinder the detection of the desired signal by distorting the received signal. This mutual interference caused by the users is called multiple access interference.

The more simultaneous users there are in the system, the greater the multiple access interference. Therefore the capacity of the CDMA cellular radio system is restricted by the above-described mutual interference caused by the users. The interference can be reduced by keeping the power levels of the signals from the terminal equipments as equal as possible in the base station receiver by means of accurate power control. The base station then monitors the powers of the received signals and transmits power control commands to the terminal equipments.

A known problem in interference-limited systems is the selection of the transmit power used at the beginning of the communication over the connection. A known solution is to start transmitting with a minimum power that is then increased by fixed steps. The disadvantage of this method is that it does not take into account the loading situation of the cell which may vary greatly, but it operates in a similar way in every situation.

In another known method, disclosed in Finnish patent application 952,396 that is incorporated herein by reference, the signal-to-noise ratio is estimated between a subscriber equipment and a base station in the uplink direction before the actual connection is established, and the transmit power is selected so that the desired signal-to-noise ratio is obtained. The disadvantage of this method is that since the terminal equipment starts transmitting directly with a power that is different from the minimum power, the transmission interferes with the other terminal equipments, which in turn must increase their transmit power in order to obtain a sufficient signal-to-noise ratio. In such a case, the total interference in the network increases needlessly.

SUMMARY OF THE INVENTION

The purpose of the present invention is to implement a method with which the correct transmit power is selected for obtaining the required signal-to-noise ratio and wherein the transmit power is increased to the desired level in such a way that no interference is caused to the other connections, taking into account the loading situation of the cell.

This is achieved with a method of the type described in the preamble, characterized in that a value with which the desired signal-to-noise ratio is obtained is calculated for the transmit power of the transmitter, and that a certain initial value is calculated for the transmit power by means of the power-control parameters of the system and a given time constant, and that the transmission is started with the calculated initial value, and that the transmit power is increased from the initial power to said value during the given time constant.

The invention also relates to a cellular radio system comprising in each cell at least one base station and a group of subscriber equipments communicating with one or several base stations, and in which cellular radio system at least some transceivers comprise means for estimating the signal-to-noise ratio between a subscriber equipment and a base station before an actual connection is set up.

The cellular radio system according to the invention is characterized in that at least some transceivers comprise means for calculating for the transmit power of the transmitter a value with which the desired signal-to-noise ratio is obtained, and means for calculating a certain initial value for the transmit power of each transmitter by means of the power-control parameters of the system and a given time constant, and that at least one transmitter comprises means for starting transmission with the calculated initial value, and means for increasing the transmit power from the initial power to said value during the given time constant.

The arrangement according to the invention can be applied in both transmission directions, i.e. for adjusting the initial power of the transmitter of both the base station and the subscriber equipment.

In an arrangement according to the preferred embodiment of the invention, the base stations measure the total interference of the signals received from the terminal equipments and transmit a pilot signal with a predetermined transmit power. For the purpose of call establishment, the terminal equipments measure the power levels of the pilot signals arriving from the base stations that are in a list of nearby base stations maintained by the terminal equipment. The attenuations over the connections between the terminal equipment and the base stations are estimated by means of the pilot signals, and the signal-to-noise ratio between the subscriber equipment and the base station in the uplink transmission direction is estimated on the basis of the total interference measured at the base station, the aforementioned attenuation over the connection, and the assumed transmit power of the terminal equipment.

In the method according to the invention, the total interference in the network is smaller than previously. Minimization of the total interference is essential in interference-limited systems, especially in CDMA systems. In systems where the traffic load varies, the optimal power level for call establishment can be obtained in each situation by utilizing the method according to the invention. The power level is not increased by fixed steps, but the rate of increase depends on the situation. The traffic load varies especially in systems with several different types of connections, such as speech and data connections, that have considerably different capacity requirements.

DESCRIPTION OF THE DRAWINGS

In the following, the invention will be described in greater detail with reference to the examples according to the accompanying drawings, in which FIG. 1 illustrates a cellular radio system where the method according to the invention can be applied, FIGS. 2a and 2b illustrate the power control method according to the invention.

DESCRIPTION OF THE PREFERRED EMBODIMENTS

Figure 3:
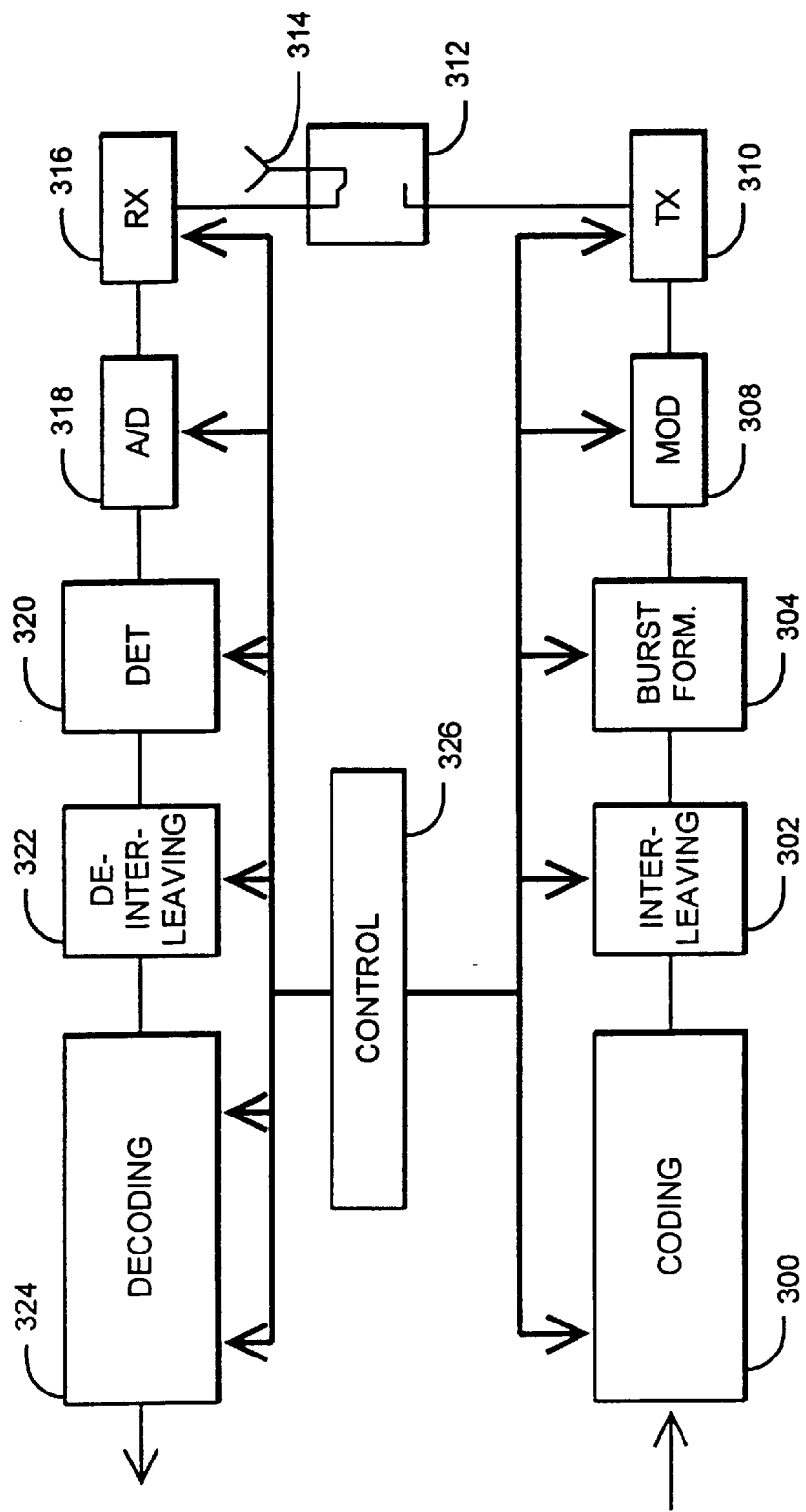
FIG. 3 is a block diagram illustrating the structure of a transceiver in a cellular radio system according to the invention.

The method and the system according to the invention will be described below in greater detail using as an example a CDMA cellular radio system utilizing a pilot signal, without restricting the description thereto, however. The method can be applied correspondingly in all interference-limited cellular radio systems. Also, the invention will be described below using as an example a situation where the initial power of a terminal equipment is adjusted. However, the invention can also be applied in a base station, as it is clear for a person skilled in the art.

FIG. 1 is a diagram of a cellular radio system where the method according to the invention can be applied. The cellular network comprises a number of base stations 100, 114 that communicate on a certain traffic channel with subscriber equipments situated within their area. In the case of a CDMA system, a traffic channel thus consists of a broad frequency band that is used by all terminal equipments when they transmit to the base station, and correspondingly, a similar frequency band is used in the downlink transmission direction, the base station transmitting to the terminal equipments situated within its area on this frequency band. In the situation illustrated in the figure, terminal equipments 110 and 112 communicate with the base station 100, and a terminal equipment 108 communicates with the base station 114.

In the system illustrated in FIG. 1, each connection typically uses a separate spreading code having a bit rate, i.e. a chip rate, that is essentially greater than the data rate, the information to be transmitted being multiplied by the spreading code and thus being spread to the broad frequency band. On the basis of the spreading code, the receivers can distinguish the desired signal from the other signals transmitted on the same frequency band. The same frequency band is used in the area of each base station 100, 114.

Several prior art CDMA systems use a so-called pilot signal that is transmitted by each base station and that is used for the detection of base stations, for power measurement and for enabling coherent reception in a mobile station. A pilot signal is a data-unmodulated spreading-coded signal that is transmitted to the coverage area of the base station in the same manner as the actual traffic channels. In fact, the coverage area of the pilot signal determines the cell size of the base station, since the terminal equipments use the pilot signal to facilitate call establishment.

The base stations thus transmit a pilot signal continuously, and the spreading codes used for transmitting the pilot signals of different base stations differ from each other in such a way that a terminal equipment can identify the base stations by means of the pilot they have transmitted.

Subscriber equipments continuously measure the pilot signals. In order to reduce the measurement load of a terminal equipment, in the prior art systems each terminal equipment keeps a list of the base stations that are situated near the terminal equipment and that are possible candidates for handover or call establishment, and of the corresponding spreading codes of the pilot signals. This list will be called below a measurement list. The terminal equipments monitor with the highest priority the pilot signals of only those base stations that are on the measurement list. The other detected pilot signals are measured secondarily.

Subscriber equipments continuously measure the quality of pilot signals transmitted from different base stations. This is necessary for maintaining the connection quality of the terminal equipment. On the basis of the measurements, it is possible to perform a handover, if necessary, to a base station providing better connection quality. In a CDMA system it is also possible that the terminal equipment communicates simultaneously with more than one base station, which is called macrodiversity. The measurements of the pilot are also essential during the call set-up, since the terminal equipment selects the base station providing the best connection when it transmits a call-set-up message.

Each terminal equipment thus has a list of the base stations that are situated near the terminal equipment and that are possible candidates for handover or call establishment, and of the corresponding spreading codes of the pilot signals. The terminal equipment measures all the pilot signals it detects, but the signals from the base stations on the measurement list are measured more often than the others, since a handover or call set-up is more likely to be performed to those base stations than to base stations situated further away. The aim is to save the measurement capacity of the terminal equipment and to direct it to signals whose changes should be detected rapidly.

In the following, the method according to the invention will be described first on the assumption that the signal-to-noise ratio over a connection between a terminal equipment and a base station and the corresponding transmit power are estimated in the terminal equipment.

The base stations transmit information on control channels to the terminal equipments concerning the transmit power $P_{t,pilot}$ used for transmitting the pilot signal. Each terminal equipment measures the power $P_{r,pilot}$ with which each pilot signal is received from each base station. On the basis of this information and the power measurement it has performed, each terminal equipment can calculate the attenuation L over the connection between the base station and the terminal equipment, i.e. the attenuation of the transmitted signal over the radio path, according to the following formula:

$$L = \frac{P_{t,pilot}}{P_{r,pilot}}.$$

The base stations also transmit information on the control channel to the terminal equipments about the interference level $I_{tot}$ they have measured in the uplink transmission direction. This information is transmitted from the base stations to the terminal equipments whenever the information changes, i.e. whenever there are significant changes in the interference level. It is then possible to forward to the terminal equipments the interference data of several base stations situated nearby.

In the arrangement according to the invention, the signal-to-noise ratio in the uplink transmission direction, i.e. from the terminal equipment to the base station, is estimated. The actual transmission direction does not have to exist for the estimation to take place. This is the case in a situation where the terminal equipment does not communicate with any base station, and it selects the base station to which it transmits the call-set-up message on the basis of the estimate it has calculated and the measurements of the pilot signal. The connection quality of the uplink transmission direction is thus estimated in advance.

The terminal equipment performs the estimation by first calculating the attenuation over the connection between the base station to be estimated and the terminal equipment in the manner described above. The terminal equipment still stores information about the transmit power $P_{MS}$ it has supposedly used, which power can be selected in such a way that the estimated SIR can be adjusted to a suitable level on the basis of several estimation rounds, if necessary.

The terminal equipment further divides the transmit power $P_{MS}$ by the attenuation L over the connection. The estimate SIR for the signal-to-noise ratio in the uplink direction is then obtained by dividing the aforementioned divided power by the total interference of the base station from which one has subtracted the effect of the signal from the estimating terminal equipment:

$$SIR = \frac{\frac{P_{MS}}{L}}{I_{tot} - \frac{P_{MS}}{L}}.$$

When the amount of calculation is to be reduced, it is possible to calculate for the signal-to-noise ratio a less accurate estimate where the effect of the signal of the estimating terminal equipment has not been removed from the total interference of the base station:

$$SIR = \frac{\frac{P_{MS}}{L}}{I_{tot}}.$$

The SIR has been described above as the ratio of two powers, but it can also be defined, if desired, by means of other units, such as decibels.

If the estimation is not performed in the terminal equipment but in the network, for example in the base station, the estimation can also then be performed in the above-described manners and by using the formulas. However, the terminal equipment must transmit on the control channel information to the base station about the received power level of the pilot $P_{r,pilot}$ and about the assumed transmit power of the terminal equipment $P_{MS}$. Correspondingly, the base station does not have to inform the terminal equipments of the total interference $I^{tot}$.

Since the terminal equipment does not communicate with any base station, the signalling between the base station and the terminal equipment takes place on the general calling channels.

The above-described method thus provides the transmit power $P_{MS}$ that produces the required signal-to-noise ratio SIR. The transmit power can also be estimated by other methods than the one described above.

In the method according to the invention, the terminal equipment does not start transmitting immediately with the transmit power calculated above, so that additional interference in the total interference of the system would be avoided. Instead, the method according to the invention comprises calculating the initial power $P_{i,MS}$ with which the transmission is started and from which the power is gradually increased to the calculated value. A suitable initial power can be calculated on the basis of the calculated actual power level and the power-control parameters of the system, for example with the following formula $$P_{i,MS} = P_{MS} * \frac{t_{PCrate}}{t_{setup}},$$

wherein $t_{PCrate}$ denotes the updating rate of the power control in the system, i.e. the length of time between the adjustments of the power of the terminal equipments. $t_{setup}$ denotes a time constant during which the transmit power is set to a level that has been calculated in advance.

The transmit power of the terminal equipment is thus increased to the desired level according to the normal power control updating rate of the system during a given time constant $t_{setup}$. The method is illustrated by way of example in FIG. 2a. The horizontal axis of the figure shows the time and the vertical axis shows the transmit power of the terminal equipment. Assume that the transmission of the terminal equipment begins at a moment $t_0$. The transmission is then started with the initial power level of $P_{i,MS}$. The power control updating rate of the system is $t_{PCrate}$ and the next time the power is adjusted is at a moment $t_0+t_{PCrate}=t_1$ and correspondingly at moments $t_2$ and $t_3$. In the example of the figure, the desired power level $P_{MS}$ is thus obtained by three steps. In an actual situation, the number of the steps is naturally different and varies depending on the situation.

According to an embodiment of the invention, the calculated power level $P_{MS}$ is updated during the power control, and when the loading of the system changes, the desired signal-to-noise ratio SIR and therefore also the desired power level may change. The situation is illustrated in FIG. 2b. Assume that the transmission of the terminal equipment begins at the moment $t_0$. The transmission is then started with the initial power level $P_{i,MS}$ that has been calculated on the basis of the transmit power $P_{MS1}$ determined by the desired signal-to-noise ratio. Assume that at the moment $t_2$ it is detected that the desired signal-to-noise ratio SIR has changed. The transmit power $P_{MS2}$ corresponding to the new ratio differs from the one calculated previously. Correspondingly, if the total interference $I_{tot}$ changes, the transmit power must be changed in order to obtain the desired SIR. A new power control step is then calculated on the basis of the current transmit power. In the example of FIG. 2b, the length of the step decreases.

Examine below the structure of a transceiver used in a cellular radio system according to the invention. FIG. 3 illustrates a transceiver of a cellular radio system where the method according to the invention can be applied. The transceiver may be situated either in the base station equipment or it may be a subscriber equipment. The structure of the equipment is similar in both alternatives in the elements essential to the invention.

The transceiver comprises means for encoding 300 the signal to be transmitted, the signal encoded with the means being supplied to means 302 for interleaving the encoded signal. The output signal of the interleaving means is connected to the input of means 304 where the burst to be transmitted is formed. The obtained signal is supplied to modulation means 308 that have an output signal that is supplied via a transmitter unit 310 and a duplex filter 312 to an antenna 314.

The transceiver further comprises a receiver unit 316 where the received signal is converted into an intermediate frequency, and converter means 318 where the signal is converted into a digital form. The converted signal is supplied to detection means 320 from where the detected signal is supplied further to deinterleaving means 322 and to means 324 where the received signal is decoded i.e. subjected to both channel and speech decoding. The equipment further comprises control and calculation means 326 which control the operation of the other aforementioned blocks. The control and calculation means are typically realized by means of a processor.

The base station equipment according to the invention comprises means 320, 326 for measuring the total interference of the signal received from the terminal equipments, and means 300–314, 326 for transmitting a pilot signal with a known transmit power. Correspondingly, the subscriber equipment comprises means 320, 326 for measuring the power of the pilot signal it has received from the base station. If the system is a CDMA system, the receivers, which are typically realized with the rake principle, have a detection block that normally comprises several receiver branches at least one of which is a so-called searcher branch that measures the strengths of the pilot signals.

A transceiver according to the preferred embodiment of the cellular radio system of the invention also comprises means 320, 326 for estimating the attenuation over the connection between the terminal equipment and the base station by means of the received power of the pilot signal and the power used in the transmission. The transceiver of the cellular radio system according to the invention further comprises means 320, 326 for estimating the signal-to-noise ratio of the uplink direction and the required transmit power $P_{MS}$ on the basis of the total interference and the attenuation over the connection measured according to the above-described method. The transceiver further comprises means (326) for calculating a certain initial value $P_{i,MS}$ for the transmit power of each terminal equipment on the basis of the power-control parameters of the system and a given time constant.

In the system according to the invention, at least one terminal equipment (108–112) comprises means (310, 326) for starting transmission to the base station (100) with the calculated initial value, and means (310, 326) for increasing the transmit power from the initial power to the aforementioned value during a given time constant $t_{setup}$.

Even though the invention is described above with reference to the example according to the accompanying drawings, it is clear that the invention is not restricted thereto, but it can be modified in many ways within the scope of the inventive idea disclosed in the appended claims.

What is claimed is:

1. A method for adjusting a transmit power of a communication over a communication channel in a cellular radio system comprising the steps of:

estimating a desired signal-to-noise ratio of the communication over the communication channel between a base station and a subscriber equipment before the communication channel is established;

calculating, during a call set-up period, a desired transmit power value for transmitting the communication over the communication channel from a transmitter in the system, wherein the desired signal-to-noise ratio is obtained;

calculating, during the call set-up period, an initial transmit power value for transmitting the communication over the communication channel using at least one power control parameter of the system and a predetermined time constant, wherein the initial power value is smaller than the desired power value;

initiating a transmission of the communication over the communication channel using the initial transmit power level; and increasing a transmission power of the communication from the initial transmit power level to the desired transmit power value over a predetermined time period.

2. A method according to claim 1, wherein the step of estimating the signal-to-noise ratio between the subscriber equipment and the base station comprises the step of estimating the signal-to-noise ratio in an uplink direction, and the initial transmit power is adjusted in the subscriber equipment.

3. A method according to claim 2, further comprising the steps of:

measuring in the base stations (100) the total interference of a prior signal received from the subscriber equipment (108–112);

transmitting a pilot signal from the base station with a predetermined transmit power over a control channel;

measuring at the subscriber equipment a power level of the pilot signal from each base station that is on a list of nearby base stations maintained by the subscriber equipment;

estimating the attenuations over the connections between the subscriber equipment and the base stations by means of the pilot signals; and estimating the signal-to-noise ratio between the subscriber equipment and the base station in the uplink direction on the basis of the total interference measured in the base station, the attenuation over the connection, and an assumed transmit power of the subscriber equipment.

4. A method according to claim 3, wherein the step of estimating the signal-to-noise ratio further comprises the steps of dividing the assumed transmit power of the subscriber equipment by the estimated attenuation over the connection and calculating the ratio of a value obtained by the dividing step to the total interference measured in the base station.

5. A method according to claim 4, further comprising the step of subtracting the ratio of the value obtained by the dividing step to the total interference from the total interference before the estimate for the signal-to-noise ratio has been calculated.

6. A method according to claim 1, wherein the step of estimating the signal-to-noise ratio between the subscriber equipment and the base station comprises the step of estimating the signal to noise ratio in a downlink direction, and the initial transmit power is adjusted in the base station.

7. A method according to claim 1, further comprising the step of increasing the transmit power from the initial power to the calculated desired power level in a time period corresponding to the power control updating rate of the system.

8. A method according to claim 1, further comprising the step of updating the calculated desired power level to which the transmit power is increased according to the power control updating rate of the system.

9. A method according to claim 1, further comprising the step of calculating an initial value for the transmit power by multiplying the ratio between the power control updating rate of the system and the given time constant by a final desired value of the transmit power.

10. The method of claim 1 wherein the step of estimating the desired signal-to-noise ratio further comprises the steps of:
   transmitting a pilot signal with a known transmit power level from the base station to the subscriber equipment over a control channel;
   measuring a received power level of the pilot signal received from the base station at the subscriber equipment; and
   estimating an attenuation of the transmission over the communication channel by comparing the known transmit power level with the received power value.

11. The method of claim 1 wherein the call set-up period is a period of time occurring before an actual connection between the base station and the subscriber equipment is established.

12. A cellular radio system comprising:
   at least one base station;
   at least one subscriber equipment, each subscriber equipment adapted to communicate with one of the base stations;
   a transceiver in the base station adapted to estimate a signal-to-noise ratio between the subscriber equipment and the base station in an uplink direction before an actual connection between the subscriber equipment and the base station is established, wherein the transceiver is further adapted to:
      calculate a desired transmit power for a transmitter in the subscriber equipment corresponding to the estimated signal-to-noise ratio;
      calculate an initial transmit power value for the transmitter using at least one power control parameter of the system and a time constant, the initial transmit power value being used to start a transmission between the subscriber equipment and the base station after the connection is established; and
      increase the transmission power of the transmission from the initial transmit power value to the desired transmit power during a period of time corresponding to the time constant.

13. A cellular radio system according to claim 12 wherein the transceiver (108–112) is situated in the base station (100).

14. A cellular radio system according to claim 12 wherein the transceiver (108–112) is situated in the subscriber equipment.

15. A cellular radio system according to claim 14, wherein the base station comprises:
   means (320, 326) for measuring the total interference of at least one signal received from the subscriber equipment, and
   means (310) for transmitting a pilot signal with a predetermined transmit power; and
wherein the subscriber equipment (108–112) comprises:
   means (320–326) for measuring the power levels of the pilot signal received from the base station, and wherein the transceiver comprises:
      means (320, 326) for estimating an attenuation over the connection between the subscriber equipment and the base station by means of the pilot signals and means (320, 326) for estimating the signal-to-noise ratio between the subscriber equipment and the base station in the uplink direction on the basis of a total interference measured in the base station (100), the attenuation over the connection, and an assumed transmit power of the subscriber equipment (108–112).

16. A cellular radio system according to claim 14, p wherein the means (320, 326) for estimating the signal-to-noise ratio between the subscriber equipment and the base station are situated in the subscriber equipment (108–112).

17. A cellular radio system according to claim 14, wherein the means (320, 326) for estimating the signal-to-noise ratio between the subscriber equipment and the base station are situated in the base station.

18. A cellular radio system according to claim 14, wherein the transmitter is adapted to increase its transmit power from the initial power to the desired power level according to the power control updating rate of the system.

19. A cellular radio system according to claim 14, wherein the transmitter comprises means (310, 326) for updating the desired power level to which the transmit power of the subscriber equipment is increased according to the power control updating rate of the system.

20. A system for determining a transmit power level for a communication channel in a cellular radio system comprising:
   at least one base station;
   at least one terminal device adapted to communicate with the base station over the communication channel; and
   a transceiver adapted to establish the communication pathway between the base station and the terminal device, wherein before the communication pathway is established, the transceiver is adapted to estimate a desired power transmit value for a transmission over the communication pathway and an initial power transmit level, wherein the initial power level is calculated to provide a low quality signal-to-noise ratio, the desired power transmit level being determined by estimating a signal-to-noise ratio of the communication pathway in an uplink direction by monitoring an attenuation of a pilot signal transmitted by the base station to the terminal device over a control channel, and wherein the transceiver initiates the transmission over the communication pathway using the initial power level with the low quality signal-to-noise ratio and increases a transmission power level of the communication to the desired power level having a good quality signal-to-noise ratio over a time period.

21. The system of claim 20 wherein the transceiver is located in the terminal device and is adapted to measure a received power level of the pilot signal transmitted by the base station over the control channel and determine the attenuation of the pilot signal based on a known transmit power of the pilot signal and the received power level.

* * * * *